United States Patent [19]

Kiya

[11] Patent Number: 4,608,644
[45] Date of Patent: Aug. 26, 1986

[54] TOOL LIFE, OFFSET, AND SELECTION SUPERVISION METHOD

[75] Inventor: Nobuyuki Kiya, Tokyo, Japan
[73] Assignee: Fanuc Ltd, Minamitsuru, Japan
[21] Appl. No.: 616,827
[22] PCT Filed: Oct. 6, 1983
[86] PCT No.: PCT/JP83/00330
§ 371 Date: May 17, 1984
§ 102(e) Date: May 17, 1984
[87] PCT Pub. No.: WO84/01534
PCT Pub. Date: Apr. 26, 1984

[30] Foreign Application Priority Data

Oct. 7, 1982 [JP] Japan ............................. 57-176692

[51] Int. Cl.$^4$ .................. G05B 19/403; B23Q 15/16
[52] U.S. Cl. .................................... 364/474; 364/184; 29/568
[58] Field of Search ............. 364/474, 184, 170, 475; 29/568; 318/563, 632, 572

[56] References Cited

U.S. PATENT DOCUMENTS 4,442,494  4/1984  Fromson et al. ................ 364/474
4,497,029  1/1985  Kiyokawa ...................... 364/184

Primary Examiner—Jerry Smith
Assistant Examiner—Allen MacDonald
Attorney, Agent, or Firm—Staas & Halsey

[57] ABSTRACT

A tool life supervision method in which the life of a tool is monitored and machining is performed by using another tool when a former tool has reached the end of its life. The tool life supervision method includes the steps of setting in memory means a number of parts to be machined, which number conforms to tool life; setting in the memory means a tool selection number correction value Nct; inserting at an end of an NC machining program at least an instruction or symbol which indicates the end of the program; counting instructions or symbols indicating the end of a program; monitoring whether a counted value coincides with the preset number of parts to be machined and counting the number of times coincidence is achieved; performing the following operation using an arithmetic circuit 110:

$$Nt + Nct \cdot n$$

wherein n represents the number of times coincidence is achieved, Nt represents a tool selection number indicated by a tool selection instruction in the NC machining program, and Nct represents a tool selection number correction value, and selecting a tool by employing the result of the aforesaid operation as an actual tool selection number.

10 Claims, 6 Drawing Figures

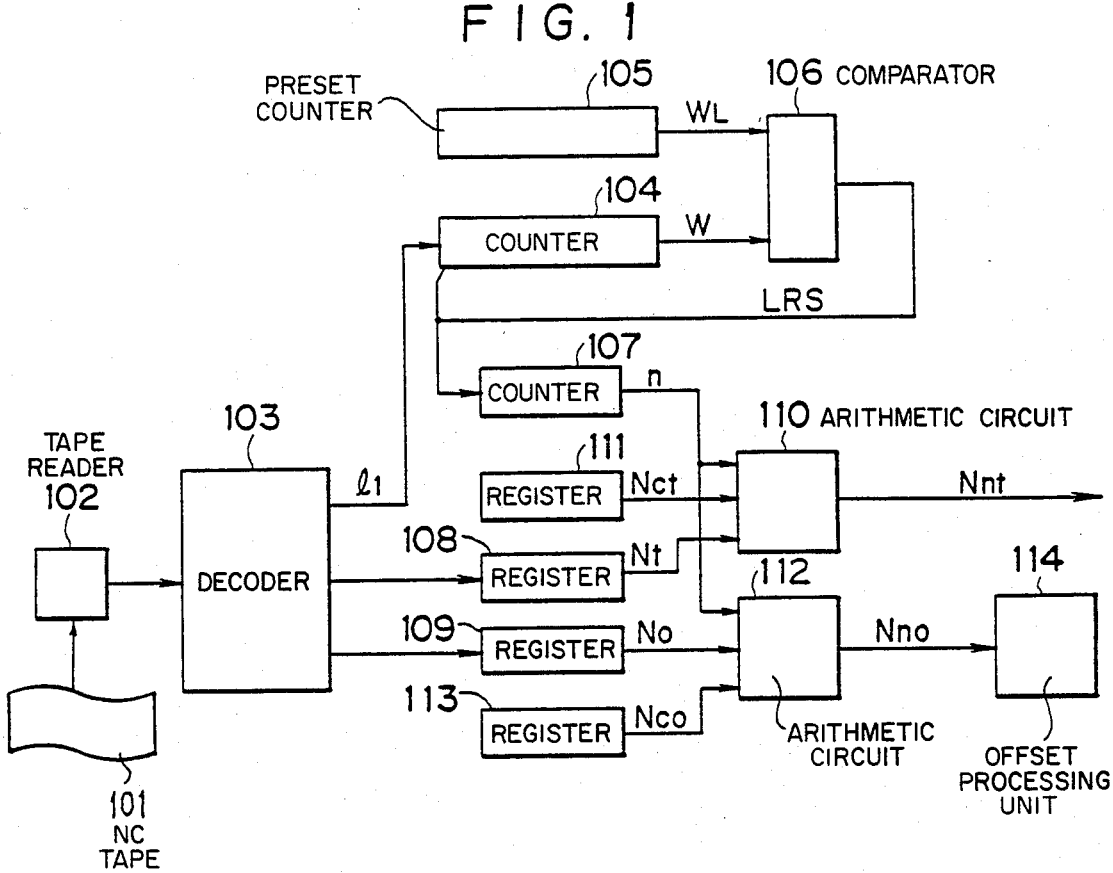
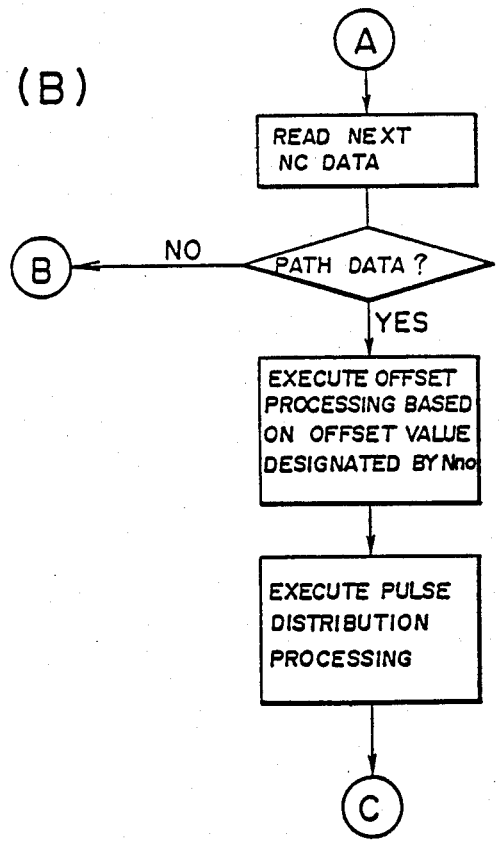

FIG. 2

| Tool selection instructions in NC machining program | n = 0 | n = 1 | n = 2 | n = 3 | n = 4 | n = 5 | n = 6 |
|---|---|---|---|---|---|---|---|
| T01 | T01 | T11 | T21 | T01 | T11 | T21 | T01 |
| T02 | T02 | T12 | T22 | T02 | T12 | T22 | T02 |
| T03 | T03 | T13 | T23 | T03 | T13 | T23 | T03 |
| T04 | T04 | T14 | T24 | T04 | T14 | T24 | T04 |
| T05 | T05 | T15 | T25 | T05 | T15 | T25 | T05 |
| T06 | T06 | T16 | T26 | T06 | T16 | T26 | T06 |
| T07 | T07 | T17 | T27 | T07 | T17 | T27 | T07 |
| T08 | T08 | T18 | T28 | T08 | T18 | T28 | T08 |
| T09 | T09 | T19 | T29 | T09 | T19 | T29 | T09 |

FIG. 3

| TOOl OFFSET NO. IN NC MACHINING PROGRAM | n=0 | n=1 | n=2 | n=3 | n=4 | n=5 | n=6 |
|---|---|---|---|---|---|---|---|
| 01 | 01 | 11 | 21 | 01 | 11 | 21 | 01 |
| 02 | 02 | 12 | 22 | 02 | 12 | 22 | 03 |
| 03 | 03 | 13 | 23 | 03 | 13 | 23 | 03 |
| 04 | 04 | 14 | 24 | 04 | 14 | 24 | 04 |
| 05 | 05 | 15 | 25 | 05 | 15 | 25 | 05 |
| 06 | 06 | 16 | 26 | 06 | 16 | 26 | 06 |
| 07 | 07 | 17 | 27 | 07 | 17 | 27 | 07 |
| 08 | 08 | 18 | 28 | 08 | 18 | 28 | 08 |
| 09 | 09 | 19 | 29 | 09 | 19 | 29 | 09 |

TOOL LIFE, OFFSET, AND SELECTION SUPERVISION METHOD

BACKGROUND OF THE INVENTION

This invention relates to a tool life supervision method and, more particularly, to a tool life supervision method in which the life of a tool is monitored and machining is performed by using a new tool when the former tool has reached the end of its life.

In numerical control (NC) machining tools sustain wear, and when a tool has reached the end of its life machining can no longer be carried out in the manner commanded. Accordingly, conventional practice, as disclosed in Japanese Patent Publication No. 51-48825 (Japanese Patent Application No. SHO 47-80915), is to supervise tool life tool by tool and when a tool reaches the end of its life, to use a succeeding tool in accordance with a pre-registered sequence For example, the method includes monitoring utilization time for a certain tool (namely machining time using the tool), and employing a new tool when total utilization time reaches that conforming to a preset tool life.

With the foregoing tool life supervision method, however, (a) tool life supervision must be performed tool by tool, and (b) supervision of utilization sequence must be carried out, wherein a plurality of tools are prepared with respect to a single tool number, the tool utilization sequence is registered in advance, and new tools are used in the registered sequence as the preceding tools reach the end of their respective lives. For such reasons, supervision is a complicated matter.

SUMMARY OF THE INVENTION

Accordingly, an object of the present invention is to provide a simple method of performing tool life supervision.

Another object of the present invention is to provide a method wherein, rather than requiring tool life supervision to be performed tool by tool, all tools commanded by a single NC machining program can be subjected to tool life supervision en bloc.

A further object of the present invention is to provide a tool life supervision method wherein, even though a plurality of identical tools are assigned different tool numbers, a tool number commanded by an NC machining program is changed automatically when the tool presently in use comes to the end of its life, whereby a tool identical with the expended tool can be selected automatically thereafter.

Still another object of the present invention is to provide a tool life supervision method wherein when a tool presently in use comes to the end of its life, a tool identical with the expended tool can be subsequently selected by automatically changing a tool number commanded by an NC machining program, and wherein a tool offset number commanded by an NC machining program can be changed automatically to a tool offset number conforming to a selected tool.

The present invention is a tool life supervision method in which the life of a tool is monitored and machining is performed by using another tool when a former tool has reached the end of its life. Particularly, the invention provides a tool life supervision method wherein tool life supervision for all tools commanded by a single NC machining program can be performed en bloc so that it is unnecessary to perform tool life supervision tool by tool. The tool life supervision method includes the steps of assigning different tool numbers to a plurality of identical tools in advance; setting in a memory means, a number of parts to be machined, which number conforms to tool life, as well as a tool selection number correction value; inserting at the end of an NC machining program an instruction or symbol which indicates the end of the program; counting instructions or symbols indicating the end of a program; monitoring whether the counted value coincides with the preset number of parts to be machined and counting the number of times coincidence is achieved; performing the following operation:

$$Nt + Nct \cdot n$$

wherein n represents the number of times coincidence is achieved, Nt represents a tool selection number indicated by a tool selection instruction in the NC machining program, and Nct represents a tool selection number correction value; and selecting a tool by employing the result of the aforesaid operation as an actual tool selection number.

BRIEF DESCRIPTION OF THE DRAWINGS

FIG. 1 is a block diagram of a first embodiment of the present invention;

FIG. 2 is view for explaining a tool selection number of an actually selected tool;

FIG. 3 is a view for explaining a tool offset number of an actually selected tool;

DESCRIPTION OF THE PREFERRED EMBODIMENTS

Figure 4:
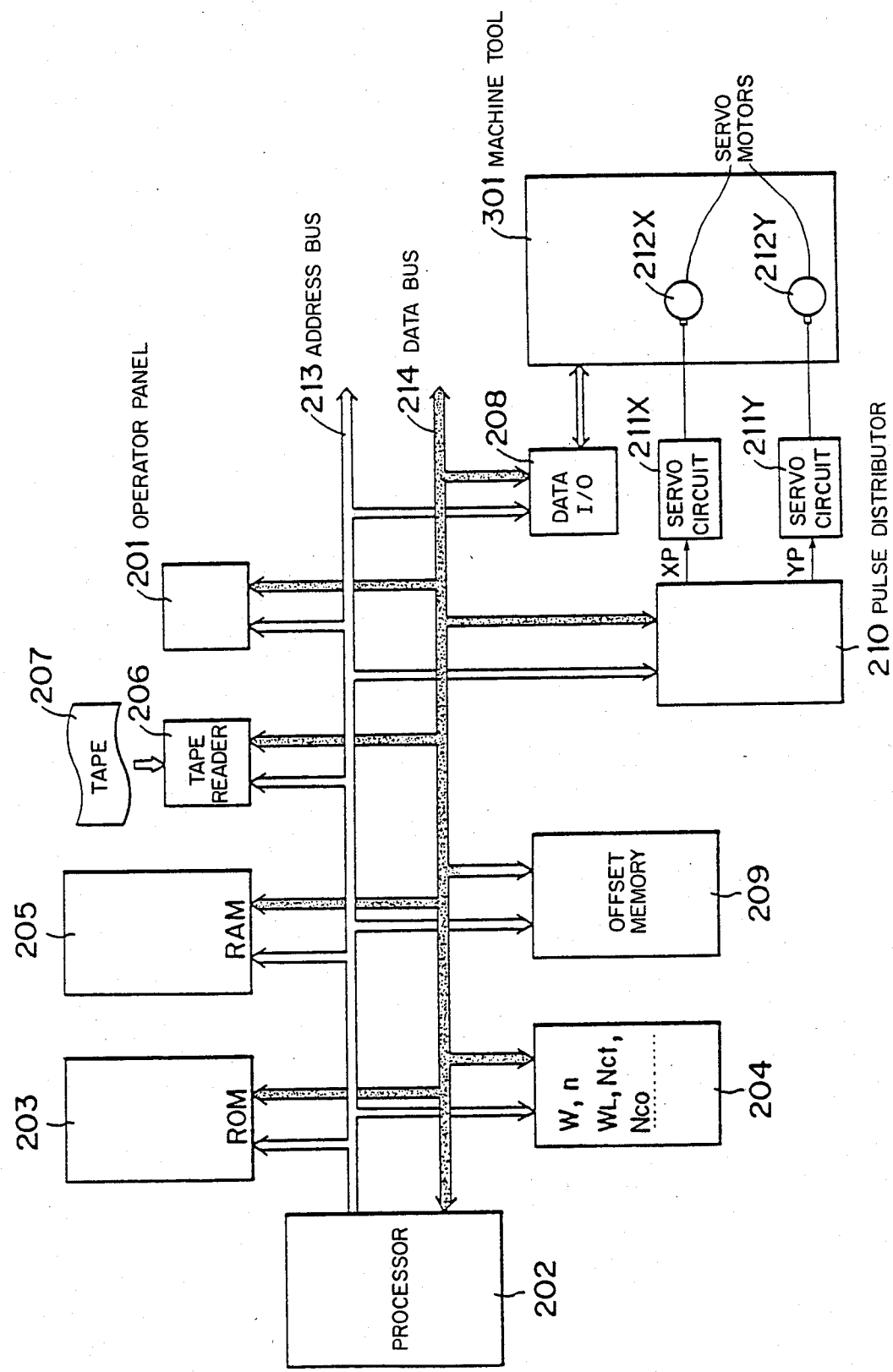
FIG. 4 is a block diagram of a second embodiment of the present invention.

The present invention will now be described in detail with reference to the drawings FIG. 1 is a block diagram of a first embodiment for practicing the present invention. NC machining program data for machining a given workpiece into a part having a predetermined shape are recorded on an NC tape 101. The NC machining program includes tool selection instructions at suitable locations, and at the end thereof an instruction M02 (program end auxiliary function instruction) or M30 (tape end auxiliary function instruction) indicating the end of the program, or a symbol registered in advance to indicate the end of the program. A tool selection instruction, it should be noted, is expressed in the form T☐☐☐☐, namely by the letter of the alphabet "T" indicating tool selection, and a four-digit numerical value following "T". A tool selection number is specified by the two leftmost digits, and a tool offset number by the two rightmost digits. A tape reader 102, in response to an indication from a control unit (not shown), reads NC machining data from the NC tape one block at a time and applies the read NC machining data to a decoder 103. The decoder 103 decodes the NC machining data and delivers a high-level ("1") output on a line $L_1$ when M02, M30 or the symbol is discriminated. A counter 104 is incremented whenever a "1" appears on line $L_1$, thereby counting the number W of machined workpieces Preset in a preset counter 105 is a number $W_L$ of parts to be machined, the number conforming to the life of the particular tool. More specifically, when a tool has contributed to machining a number of parts equivalent to the set number $W_L$, this is taken as indicating that the tool nose has sustained wear and is no longer capable of performing machining correctly in the manner commanded. A comparator 106 monitors whether the counted value (number of parts) W in the counter 104 is equivalent to the number $W_L$ of parts to be machined, and produces a signal LRS, which indicates end of tool life when coincidence between W and $W_L$ is attained. The counted value in counter 104 is cleared by the signal LRS, and the counter 107 counts the signal LRS to record the number of times n the signal is generated (i.e., the number of times a tool has reached the end of its life).

Meanwhile, when the letter of the alphabet "T" is discriminated, the decoder 103 sets the two leftmost digits (tool selection number) in a register 108 and the two rightmost digits (tool offset number) in a register 109 When a tool selection instruction is read from the NC tape and a tool selection number Nt is set in the register 108, an arithmetic circuit 110 performs the operation given by:

$$Nt + Nct \cdot n \rightarrow Nnt \qquad (1)$$

with the result of the operation being delivered as an actual tool selection number Nnt. It should be noted that Nct in the foregoing equation is a tool selection number correction value preset in a register 111. As a result of the foregoing operations, when the number of times n a tool has reached the end of its life is zero, the tool selection number Nt of the tool selection instruction is applied to the machine as the actual tool selection number Nnt. If the number of times a tool has reached the end of its life is one or more, the result of performing the operation of Eq. (1) is delivered as the actual tool selection number. Describing a specific case where the tool selection number correction value is 10 and the maximum value of the tool selection number is 30, the actual tool selection numbers will be as shown in FIG. 2, depending upon n, where n=0, 1, 2, . . . and so on. It is assumed that the tools indicated by the tool selection numbers T0i, T1i, T2i are all of an identical type, so that three identical tools are prepared It will be apparent from the foregoing that, when n=0 holds, the tool selection number T0i in the NC machining program is delivered intact as the actual tool selection number. When n=1 holds, T1i is delivered even though T0i is the tool selection number in the machining program. When n=2 holds, T2i is delivered even though T0i is the tool selection number in the machining program. From n=3 onward, the tool selection number T0i in the machining program is again produced, after which tool selection numbers are delivered in the manner set forth above. Thus, whenever a tool reaches the end of its life, the actual tool selection number changes in the fashion T0i→T1i→T2i→T0i→T1i→ . . . and so on. Accordingly, if three identical tools are prepared and are assigned tool numbers T0i, T1i, T2i, then, when tool T0i reaches the end of its life, the succeeding tool T1i is used, and when tool T1i reaches the end of its life, the succeeding tool T2i is used. Before tool T2i is expended, tool T0i is exchanged for an unworn, new tool, and this new tool T0i is employed when tool T2i reaches the end of its life. Note that when the result Nnt of performing the operation of Eq. (1) exceeds the maximum value 30, the arithmetic circuit 110 delivers, as the tool selection number, a value obtained by subtracting the maximum value from the result Nnt. However, it can be so arranged that the the result of performing Eq. (1) does not exceed 30. This can be done by providing the counter 107 with a capacity of three, so that the value counted thereby will undergo a transition given by 0→1→2→0→1→ . . . and so on whenever the signal indicating the end of a tool life is generated.

When a tool selection instruction is read from the NC tape and a tool offset number No is set in the register 109, an arithmetic circuit 112 performs the operation given by:

$$No + Nco \cdot n \rightarrow Nno \qquad (2)$$

with the result of the operation being delivered as an actual tool offset number Nno. It should be noted that Nco in the foregoing equation is a tool offset number correction value preset in a register 113. As a result of the foregoing operations, when the number of times n a tool has reached the end of its life is zero, the tool offset number No of the tool selection instruction is delivered intact to an offset processing unit 114 as the actual tool offset number Nno. If the number of times a tool has reached the end of its life is one or more, the result of performing the operation of Eq. (2) is delivered as the actual tool offset number. Describing a specific case where the tool offset number correction value is 10 and the maximum value of the tool offset number is 30, the actual tool offset numbers will be as shown in FIG. 3, depending upon n, where n=0, 1, 2, . . . and so on.

It will be apparent from the foregoing that, when n=0 holds, a tool offset number "0i" in the NC machining program is delivered intact as the actual tool offset number. When n=1 holds, "1i" is delivered even though "0i" is the tool offset number in the machining program. When n=2 holds, "2i" is delivered even though "0i" is the tool offset number in the machining program. From n=3 onward, the tool offset number "0i" in the machining program is again produced, after which tool offset numbers are delivered in the manner set forth above. Thus, whenever a tool reaches the end of its life, the actual tool offset number changes in the fashion "0i"→"1i"→"2i"→"0i"→"1i"→ . . . and so on.

Accordingly, if three identical tools having different offset values are prepared and are assigned tool numbers T0i, T1i, T2i, and if the offset value of tool number T0i is stored in a dial or offset memory conforming to a tool offset number "03", the offset value of tool number T1i is stored in a dial or offset memory conforming to a tool offset number "13", and the offset value of tool number T2i is stored in a dial or offset memory conforming to a tool offset number "23", then, whenever tools reach the end of their respective lives, new tools are selected one after another and offset correction processing in accordance with the offset value of the new tool is executed.

Figure 5:
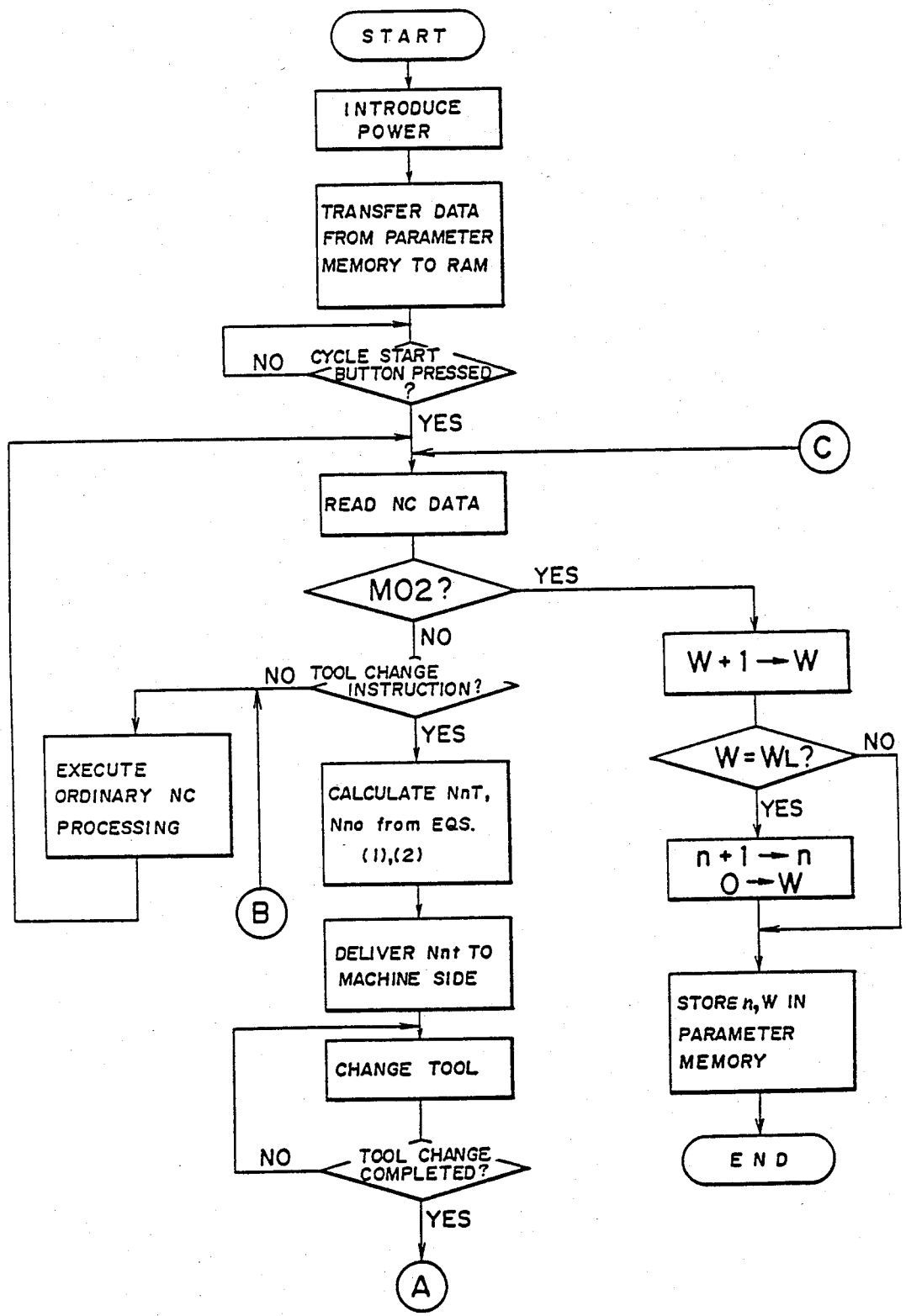
FIGS. 5A and 5B are flowcharts of processing associated with the embodiment of FIG. 4.

FIG. 4 is a block diagram of an embodiment in which the present invention is applied to a computerized NC apparatus. Tool life supervision will be described hereafter with reference to FIGS. 4 and 5.

(a) When a power button on an operator's panel 201 is pressed to introduce power, a processor 202, under the control of a control program stored in a ROM 203, transfers to a RAM 205: the number W (initially zero) of parts machined; the number of times n (initially zero) a tool has come to the end of its life; the number $W_L$ of parts to be machined, which conforms to tool life; the tool selection number correction value Nct; and the offset number correction value Nco, these having been stored beforehand in a non-volatile parameter memory 204.

(b) Next, pressing a cycle start button (not shown) on the operator's panel 201 causes the processor 202 to drive a tape reader 206 and read one block of NC data from an NC tape 207.

(c) Thereafter, the processor 202 determines whether the NC data read under the control of the control program stored in the ROM 203 is M02, which indicates program end.

(d) If the NC data is not M02, then the processor 202 determines whether the NC data is a tool exchange instruction T☐☐☐☐.

(e) If the NC data is not a tool exchange command, the processor 202 executes ordinary NC processing. When such processing ends, the processor 202 reads the next block of NC data from the NC tape 207 and repeats the process steps from step (c) onward.

(f) If the NC data read in the decision step (d) is the tool exchange instruction, the processor executes the operations of Eqs. (1), (2) to derive the actual tool selection number Nnt and actual tool offset number Nno, respectively. Let the tool selection number correction value Nct and offset number correction value Nco each be 10, and let the maximum value of the tool selection number and of the offset number be 30. Then, if the result of performing the operation of Eq. (1) and of Eq. (2) is 30 or more, values obtained by subtracting 30 from these results serve as the tool selection number and tool offset number, respectively.

(g) When the calculations in accordance with Eqs. (1) and (2) end, the processor 202 delivers both the tool exchange instruction and the calculated tool selection number Nnt to a machine tool 301 through a data input-/output unit 208.

(h) Upon receiving the tool exchange instruction and tool selection number, the machine tool 301 effects a tool change by means of an automatic tool change mechanism, not shown.

(i) When the tool change ends, the maching tool 301 delivers a tool change completion signal to the data input/output unit 208.

(j) The processor 202 constantly monitors whether the tool change completion signal has been generated. If generation of the tool change completion signal is recogized, the processor 202 drives the tape reader 206 and reads the next NC data from the NC tape 207.

(k) The processor determines whether the NC data read is path data and executes ordinary NC processing if it is not. If the data is path data, then the processor goes to an offset memory 209 and reads an offset value indicated by the offset number Nno, which is the result of performing the operation of Eq. (2). The processor then executes well-known offset processing.

(l) Next, the processor 202 calculates incremental quantities $\Delta X$, $\Delta Y$ along the respective axes based on the results of the offset processing, and delivers the incremental values to a pulse distributor 210. On the basis of the incremental quantities input thereto, the pulse distributor 210 performs a pulse distribution operation to generate distributed pulses XP, YP applied to servo circuits 211X, 211Y. The latter drive servomotors 212X, 212Y in response to the distributed pulses XP, YP, thereby to transport a tool or table.

(m) When the tool or table reaches a target position, the processor 202 reads the next NC data from the NC tape 207 and repeats the process steps from step (c) onward.

(n) If the NC data read is found, indecision step (c), to be the program end instruction M02, then the processor 202 performs the operation given by:

$$W+1 \rightarrow W \qquad (3)$$

to update the number W of parts machined.

(o) Next, the processor determines whether the number W of parts machined has become equal to the number $W_L$ of parts to be machined, which number is set in accordance with tool life.

(p) If the number W of parts machined is equal to the number $W_L$ of parts to be machined, then the following operations are performed:

$$n+1 \rightarrow n \qquad (4)$$

$$0 \rightarrow W \qquad (5)$$

thereby incrementing the number of times n a tool has come to the end of its life, and clearing the number W to zero.

(q) After performing the operations of Eqs. (4) and (5), or if $W<W_L$ is found to hold in the decision step (o), n and W are stored in the parameter memory 204, thereby ending a series of tool life supervision process steps. In FIG. 4, note that numerals 213, 214 denote address and data buses, respectively.

According to the present invention, a number of machined parts, which corresponds to tool life, is preset, instructions or symbols indicating program end are counted to record the number of parts machined, and all tools used in machining the part are changed when the actual number of parts machined coincides with the number to be machined, the latter number corresponding to tool life. Thus, tool life supervision is simplified as there is no need to exercise tool life supervision tool by tool.

In addition, different tool numbers can be assigned to a plurality of identical tools, and when a tool comes to the end of its life, the tool number of a new tool to be used thereafter can be obtained automatically merely by executing the operation indicated by Eq. (1). This greatly simplifies tool utilization sequence supervision.

Further, the offset number of a new tool put into use when a tool reaches the end of its life can be obtained merely by executing the operation indicated by Eq. (2), thereby making it possible to simplify offset processing as well. Still further, the maximum values of the tool selection number and tool offset number are decided. The arrangement is such that when the results of performing Eqs. (1), (2) exceed these maximum values, values obtained by, for examples the subtraction of these maximum values serve as the tool selection number and tool offset number, and such that the tool offset number and tool offset value are changed in cyclic fashion. Accordingly, tool life supervision is simplified.

It goes without saying that the contents of counters 104, 107 and of preset counter 105 and registers 111, 113 in FIG. 1 are saved in a non-volatile memory before electric power is cut off, and that these contents are restored after power is introduced. Also, in the foregoing, it was assumed that the tool selection number correction value Nct and tool offset number correction value Nco were both ten. However, if the number of tools used in a single machining program is five, then Nct, Nco can be arranged to each have a value of five. That is, if it is assumed that the number of tools used in a single machining program generally is m, then it will suffice to set Nct, Nco to m.

Thus, according to the present invention, it is so arranged that tool life supervision for all tools commanded by a single NC machining program can be performed en bloc, and it is unnecessary to perform tool life supervision tool by tool. Therefore, the invention is well-suited for application to numerically controlled machine tools.

I claim:

1. A tool life supervision method in which the life of a tool is monitored and machining is performed by automatically using another tool when a former tool has reached the end of its life, the method comprising the steps of:

(a) setting in memory means a number $W_L$ of parts to be machined, which number conforms to tool life, and setting in the memory means a tool selection number correction value Nct;

(b) inserting at an end of an NC machining program at least an instruction or symbol which indicates the end of the program;

(c) detecting and counting the number of times W the instruction or symbol indicating the end of a program is detected;

(d) monitoring whether the counted value W coincides with a preset number $W_L$ of parts to be machined and;

(e) counting the number of times n coincidence is achieved and performing the following operation to determine a tool selection number:

$$Nt + Nct \cdot n$$

wherein NT represents a tool selection number indicated by a tool selection instruction in the NC machining program; and (f) selecting a tool by employing the result of the aforesaid operation as an actual tool selection number.

2. A tool life supervision method according to claim 1, wherein the counted value W and the number n are stored commonly for all tools commanded by the NC machining program.

3. A tool life supervision method according to claim 1, wherein tools designated by the tool selection numbers $Nt + Nct \cdot n$ (n = 0, 1, 2, ...) identify identical type tools.

4. A tool life supervision method according to claim 1, wherein the tool selection number correction value Nct is selected to be m when a number of tools used by a single NC machining program is m.

5. A tool life supervision method according to claim 1, further comprising the steps of:

presetting a maximum value of the actual tool selection number; and limiting the result of said operation when the result of said operation exceeds the maximum value by subtracting said maximum value from the tool selection number determined in step (e).

6. A tool life supervision method in which the life of a tool is monitored and machining is performed by automatically using another tool when a former tool has reached the end of its life, the method comprising the steps of:

(a) setting in memory means (i) a number $W_L$ of parts to be machined, which number conforms to tool life, (ii) a tool selection number correction value Nct, and (iii) a tool offset number correction value Nco;

(b) inserting at an end of an NC machining program at least an instruction or symbol which indicates the end of the program;

(c) detecting and counting the number of times W the instruction or symbol indicating the end of a program is detected;

(d) monitoring whether the counted value W coincides with the preset number $W_L$ of parts to be machined;

(e) counting the number of times n coincidence is achieved and performing the following operations to respectively determine a tool selection number and an actual tool offset number:

$$Nt + Nct \cdot n \rightarrow Nnt$$

$$No + Nco \cdot n \rightarrow Nno$$

wherein Nt represents a tool selection number indicated by a tool selection instruction in the NC machining program and No represents a tool offset number;

(f) selecting a tool by employing Nnt as an actual tool selection number; and (g) executing tool offset processing by employing Nno as an actual tool offset number.

7. A tool life supervision method according to claim 6, wherein the counted value W and the number n are stored commonly for all tools commanded by the NC machining program.

8. A tool life supervision method according to claim 6, wherein the tool selection number correction value Nct and the tool offset number correction value Nco are both selected to be m when a number of tools used by the NC machining program is m.

9. A tool life supervision method according to claim 6, further comprising the steps of:

presetting a first maximum value of the actual tool selection number and a second maximum value of the actual tool offset number;

limiting the value of Nnt when Nnt exceeds the first maximum value by subtracting the first maximum value from Nnt to produce an actual tool selection number; and limiting the value of Nno when Nno exceeds the second maximum value by subtracting the second maximum value from Nno to produce an actual tool offset number.

10. A tool life supervision method according to claim 6, wherein the tools designated by the tool selection numbers $Nt + Nct \cdot n$ (n = 0, 1, 2, ...) identify identical type tools.

* * * * *